No. 661,340. Patented Nov. 6, 1900.
A. R. GREVER.
MEANS FOR ELECTROLYZING LIQUIDS.
(Application filed July 18, 1900.)
(No Model.)
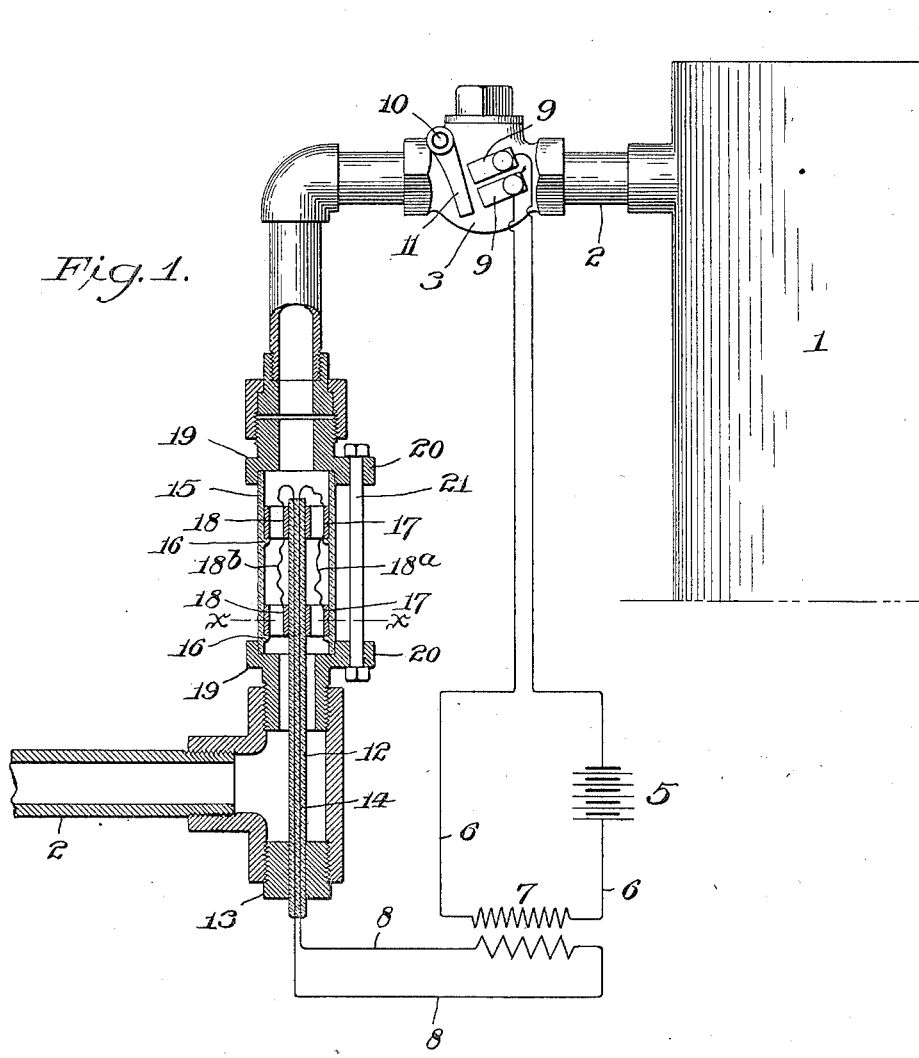
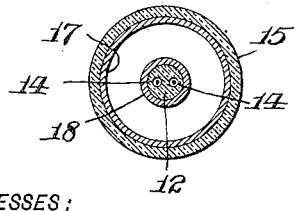
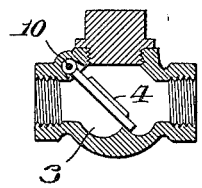
WITNESSES:
A. V. Groupe
H. D. Blackwood.
INVENTOR
Albert R. Grever,
BY John R. Nolan
ATTORNEY

UNITED STATES PATENT OFFICE.

ALBERT R. GREVER, OF PHILADELPHIA, PENNSYLVANIA.

MEANS FOR ELECTROLYZING LIQUIDS.

SPECIFICATION forming part of Letters Patent No. 661,340, dated November 6, 1900.

Original application filed May 17, 1900, Serial No. 16,982. Divided and this application filed July 18, 1900. Serial No. 23,997. (No model.)

*To all whom it may concern:*

Be it known that I, ALBERT R. GREVER, a citizen of the United States, residing in the city and county of Philadelphia, in the State of Pennsylvania, have invented certain new and useful Improvements in Means for Electrolyzing Liquids, of which the following is a full, clear, and exact description, reference being had to the accompanying drawings, forming a part of this specification.

The present application is a division of an application for Letters Patent of the United States, Serial No. 16,982, filed by me May 17, 1900, for an improvement in electric filters.

The subject of the present case relates to a simple and efficient means whereby water or other liquid may be subjected to the electrolytic action of an electric current, the invention being especially though not exclusively designed for use in connection with water-filters.

In the preferred embodiment of my invention electrodes of novel construction are arranged in the liquid-supply pipe and are connected with the terminals of a secondary electric circuit, the primary circuit being normally broken adjacent to a suitably-disposed check-valve which controls the passage of the liquid to a filter or other receiver. This valve has provision for completing the circuit when the liquid is flowing to the filter, &c., and for breaking such circuit when the flow is checked. When the primary circuit is thus completed, the liquid coursing through the supply-pipe makes contact with the electrodes in the latter, thereby completing the secondary circuit and being preforce subjected to the electrolytic action of the current.

The invention also comprises various novel features of construction and organization of parts, which will be hereinafter particularly described and claimed.

In the drawings, Figure 1 is a sectional elevation of a liquid-supply pipe and adjuncts, showing the electrodes therein and the electrical connections therefor. Fig. 2 is a vertical section of the check-valve in said pipe. Fig. 3 is a sectional detail as on the line $x$ $x$ of Fig. 1.

1 is a filter or other receptacle, and 2 is a liquid-supply pipe leading thereto. Within this pipe is a check-valve 3, the pivoted gate 4 of which is disposed to permit the flow of the liquid to the filter, &c., yet prevent its return past the valve. This valve is also adapted during the passage of the liquid therethrough to complete a normally broken electric circuit, in which are included electrodes of novel construction located within the supply-pipe in advance of the valve. Hence the electric current passes through and effects a decomposition or electrolysis of the liquid, thereby breaking up a part of the liquid and liberating therefrom oxygen and hydrogen with the production of ozone, which gases permeate the liquid and destroy the micro-organisms therein.

5 is a suitable source of electric energy, and 6 conductors leading therefrom and constituting a primary circuit.

7 is an induction-coil, and 8 conductors leading therefrom and constituting a secondary circuit. The primary circuit is interrupted exteriorly of the check-valve, the terminals thereof being secured to contacts 9 on the valve-casing. On an outer extension of the valve-stem 10 is affixed a contact-arm 11, which during the vibration of the valve swings upon and off the two contacts to make and break the circuit accordingly. When the check-valve is open, the circuit is completed and when the valve is closed the circuit is broken.

The wires of the secondary circuit are led into the vertical member of the supply-pipe and are therein connected with suitable electrodes, between which the circuit is interrupted, so that the liquid on its way to the check-valve will make electrical contact with and between the electrodes, and thus be charged with the electric current.

In the construction herein illustrated a central column 12, of insulating material, preferably glass or porcelain, is mounted within the lower portion of the supply-pipe, the column being fitted to a basal plug 13, screwed into the pipe. This column is perforated longitudinally with two parallel openings 14, through which the conductors of the secondary circuit are extended, and thereby insulated from each other. In the body of the supply-pipe is a tubular section 15, of insulating material, preferably glass, provided with internal shoulders 16, on which are supported at suitable distance apart two rings 17 of conducting material—such, for example, as platinum. The column 12 extends into this section and has affixed thereto two small conducting-rings 18, which are encircled by the rings 17, respectively. The two rings 17 are electrically connected by a wire 18$^a$, while the two inner rings are likewise connected by a wire 18$^b$. The terminals of the conductors extending through the central column are connected with the two upper rings, respectively. Thus the inner rings constitute an electrode for one of the conductors and the outer rings an electrode for the other conductor of the secondary circuit, which electrodes are separated from each other by an intervening space, through which the liquid flows on its passage to the filter or receiver, the electrodes being thereby connected to complete the secondary circuit and the liquid perforce being subjected to the electrolytic action of the current.

The tubular section 15 is detachably fitted to the supply-pipe, so that the former may be readily removed and replaced to facilitate the repairing, cleaning, or renewal of the internal electrical connections. In the present instance the respective ends of the section are seated in the ends of screw-threaded connections 19, which are screwed upon the fittings of the supply-pipe, these connections being preferably provided with laterally-extending lugs 20, which are united by a tie-bolt 21.

The operation of the apparatus may be briefly described as follows: Water (or other liquid to be treated) is directed from a suitable source of supply to the lower end of the supply-pipe, thereupon rising in the latter and making contact with the electrodes of the secondary circuit. Continuing its flow the liquid opens the check-valve 3 and passes to the filter or receiver. Upon the opening of the check-valve the primary circuit is completed, thus energizing the secondary circuit and perforce effecting the electrolysis of a part of the liquid passing in contact with the electrodes, and thereby destroying the germs, &c., in the liquid, as above explained.

I claim—

1. The combination with a receiver, and a supply-pipe connected therewith, of electrodes in the supply-pipe in advance of said receiver, and electrical connections for said electrodes, together with a valve in said pipe, and means whereby the said connections are controlled by said valve, substantially as described.

2. The combination with a pipe, of two electrically-connected rings of conducting material therein, and two smaller electrically-connected rings therein of like material separated from the other rings, a source of electric energy, and electrical connections between the same and said rings, substantially as described.

3. The combination with a pipe, and a check-valve therein, of electrodes in said pipe, a source of electric energy, electrical connections between the same and said electrodes, and means whereby the electric circuit is controlled by the operation of the check-valve, substantially as described.

4. The combination with a pipe, and a check-valve therein, of electrodes in said pipe, a source of electric energy, an induction-coil, a secondary circuit connected with the electrodes; a normally broken primary circuit, and means whereby the latter circuit is controlled by the operation of the check-valve, substantially as described.

5. The combination with a filter, of a supply-pipe connected therewith, a valve in said pipe in advance of the filter, a source of electric energy, an induction-coil, a primary circuit, a secondary circuit, and electrodes connected with the latter circuit and arranged in the path of the liquid to be filtered, together with means whereby one of said circuits is made and broken by the operation of said valve, substantially as described.

6. The combination with a tubular section of insulating material, of electrically-connected rings of conducting material supported therein, smaller electrically-connected rings of like material contained within said section and separated from the other rings, a support for the inner rings, a source of electric energy, and electrical connections between the same and the respective rings, substantially as described.

7. The combination with a supply-pipe including a detachable tubular section, of electrically-connected rings of conducting material supported therein, smaller electrically-connected rings of like material contained within said section and separated from the other rings, a perforated column of insulated material extending into said section and supporting the smaller rings, conductors extending through said column and electrically connected with the respective rings, and a suitable source of electric energy, substantially as described.

8. The combination with a tubular section of insulating material, of electrically-connected rings of conducting material supported therein, smaller electrically-connected rings of like material contained within said section and separated from the other rings, a support for the inner rings, an induction-coil, a secondary circuit electrically connected with said rings, a normally broken primary circuit, a source of electric energy, a check-valve on the supply-pipe, and means whereby the said primary circuit is controlled by the operation of the valve, substantially as described.

In testimony whereof I have hereunto affixed my signature in the presence of two subscribing witnesses.

ALBERT R. GREVER.

Witnesses:
   JOHN R. NOLAN,
   GEO. W. REED.